United States Statutory Invention Registration [19]

[11] Reg. Number: H517

Sato et al. [43] Published: Sep. 6, 1988

[54] RECOIL STARTER DEVICE

[75] Inventors: Shigeru Sato, Sayama; Tsuneo Araki, Tokyo, both of Japan

[73] Assignee: Kioritz Corporation, Mitaka, Japan

[21] Appl. No.: 29,585

[22] Filed: Mar. 25, 1987

Related U.S. Application Data

[63] Continuation of Ser. No. 823,246, Jan. 28, 1986, abandoned.

[30] Foreign Application Priority Data

Feb. 1, 1985 [JP] Japan ..... 60-13274[U]

[51] Int. Cl.[4] ..... F02N 1/00

[52] U.S. Cl. ..... 123/185 B; 123/185 A

[58] Field of Search ..... 123/185 A, 185 B, 185 BA, 123/179 SE, 185 BB

[56] References Cited

U.S. PATENT DOCUMENTS

| | | | |
|---|---|---|---|
| 1,644,932 | 10/1927 | Mack | 123/185 BA |
| 2,868,186 | 1/1959 | Schnacke | 123/185 BA |
| 3,306,277 | 2/1967 | Gudmundsen | 123/185 BA |
| 3,739,763 | 6/1973 | Berry et al. | 123/185 BA |

*Primary Examiner*—Charles T. Jordan
*Assistant Examiner*—Michael J. Carone
*Attorney, Agent, or Firm*—Browdy and Neimark

[57] ABSTRACT

A recoil starter device for starting an internal combustion engine has a recoil case attached at its one end to a portion of the internal combustion engine and opened at its other end, a shaft having one end rotatably supported by and extended through a wall of the recoil case and the other end fixedly carrying a recoil pulley on which is wound a rope, and a recoil cover detachably secured to the recoil case so as to cover the opening.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

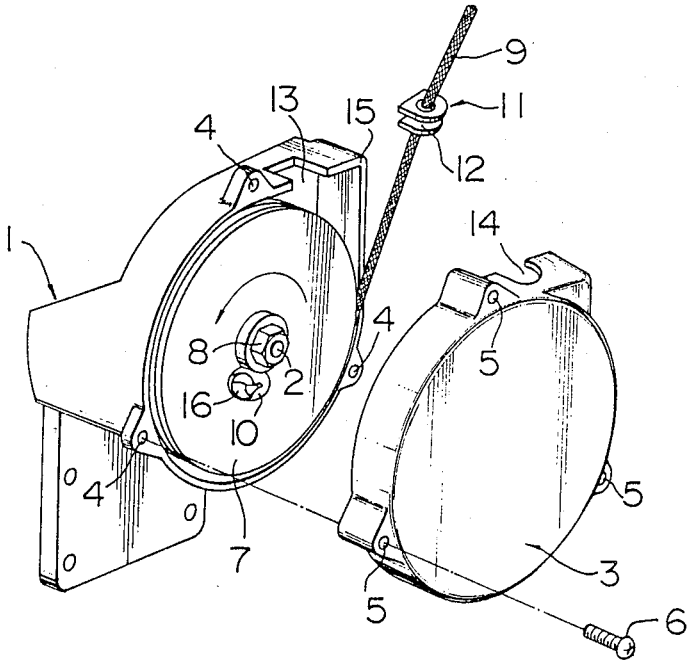
9
11
12
13
15
4
14
1
4
8
2
5
16
10
4
5
7
3
5
6

RECOIL STARTER DEVICE

This application is a continuation of application Ser. No. 823,246, filed Jan. 28, 1986, abandoned.

BACKGROUND OF THE INVENTION

1. Field of the Invention

The present invention relates to a recoil starter device which is connected through a one-way clutch to the crankshaft of an internal combustion engine for imparting starting inertia to the engine.

2. Description of the Prior Art

In the use of a recoil starter device, the user pulls a rope wound on a recoil pulley against a spiral spring, to give a torque to rotate the crankshaft through the recoil pulley, thereby starting the engine. In the conventional device, since the spiral spring and the recoil pulley are completely encased by the recoil case, the maintenance work such as renewal of torn rope requires disassembly of the whole device to separate the recoil pulley, the spiral spring and other parts. This involves a danger of springing back of the freed spiral spring. In addition, the renewal of the torn rope itself is quite a troublesome work which requires high degree of experience, as well as time and labour.

SUMMARY OF THE INVENTION

Under these circumstances, the present invention aims at providing a recoil starter device in which the renewal of the rope can be done simply by removing a cover provided on the recoil case, without requiring demounting of the recoil drum and the spiral spring, thereby obviating the above-described problems of the prior art.

To this end, according to the invention, there is provided a recoil starter device comprising: a recoil case attached at its one end to a portion of an internal combustion engine and opened at its other end; a shaft having one end rotatably supported by and extended through a wall of the recoil case and the other end fixedly carrying a recoil pulley on which is wound a rope; and a recoil cover detachably secured to the recoil case so as to cover the opening.

In this recoil starter device, the recoil pulley is exposed as the recoil cover is demounted from the recoil case. Therefore, the user can attach a new rope by leading the rope onto the peripheral surface of the recoil pulley through the rope engaging hole formed in the recoil pulley and then winding the rope on the periphery of the recoil pulley. It is thus possible to renew the rope without requiring demounting of the recoil pulley.

Namely, the user can renew the rope easily without risk of injury by springing back of the recoil spring and contamination by oil, simply by demounting the recoil cover.

BRIEF DESCRIPTION OF THE DRAWING

The attached sole Drawing is an exploded perspective view of an embodiment of a recoil starter device in accordance with the invention.

DESCRIPTION OF THE PREFERRED EMBODIMENT

A preferred embodiment of the invention will be described hereinunder with reference to the accompanying drawing.

Referring to the drawing, a recoil case 1 is fixed to the crank case (not shown) of an internal combustion engine. A shaft 2 which is rotatably supported on the wall of the recoil case 1 adjacent the crank case extends toward the crank case. The shaft 2 is adapted to be connected, through a one-way clutch (not shown) which transmits a torque from the shaft 2 only when starting the engine, to the crankshaft of the engine. The end of the recoil case 1 remote from the crank case has an opening 15 which is covered by a recoil cover 3. The recoil case 1 has three axial threaded holes 4 formed around the opening 15. On the other hand, holes 5 are formed in the portions of the recoil cover 3 corresponding to the threaded holes 4 in the recoil case 1. Screws 6 are driven into the threaded holes 4 through the holes 5 in the recoil cover 3, whereby the recoil cover 3 is fastened to the recoil case 1, thus covering the opening 15.

A recoil pulley 7 is fixed by means of a nut 8 to the end of the shaft 2 adjacent the opening 15. A rope 9 is wound on the recoil pulley 7 by several turns. The radially inner end of the rope 9 is led to the outside of the recoil pulley 7 through an aperture 10 in the central portion of the recoil pulley 7 and is knotted as at 16. Thus, the radially inner end of the rope 9 is retained by the recoil pulley 7 by means of the knot 16. On the other hand, the radially outer end of the rope 9 leaving the outer peripheral end of the recoil pulley 7 is extended outside the recoil case 1 through a rope guide 11. A recoil handle (not shown) is attached to the extreme outer end of the rope 9. The rope guide 11 is provided with a peripheral groove 12 which receives the edges of the rope-guide mounting recesses 13 and 14 of the recoil case 1 and the cover 3, so that the rope guide 11 is firmly clamped between the recoil case 1 and the cover 3 when they are assembled together.

A spiral spring (not shown) for urging the recoil pulley 7 in the rope rewinding direction is disposed between the recoil pulley 7 and the wall of the recoil case 1 adjacent the crankcase.

For attaching a new rope 9 to the pulley 7, three screws 6 are unscrewed and then the recoil cover 3 is detached from the recoil case 1. Then, the rope 9 with a knot 16 on its one end is led at its other end into the recoil pulley 7 through the aperture 10 in the latter and is wound on the peripheral surface of the recoil pulley 7 for several number of turns, e.g., three turns, in the direction of the arrow. The rope 9 is then led through the rope guide 11 and the recoil handle is attached to the extreme outer end of the rope 9. Finally, the cover 3 is attached to the case 1 by means of screws 6.

What is claimed is:

1. A recoil starter device comprising:

a recoil case having one end attached to a portion of an internal combustion engine and another opened end, a shaft having one end rotatably supported by and extended through a wall of said recoil case to connect with said internal combustion engine and an opposite end fixedly carrying a recoil pulley on which is wound a rope; and a recoil cover detachably secured by screw means to an outer side of said recoil case so as to cover said opened end, said recoil case and cover providing a recess for passing said rope where said recoil case and cover abut each other, and a rope guide having a hole therein for said rope and a peripheral groove by which it is held in said recess by respective edges of said recoil case and cover, said rope having one end extending through, and secured in, an aperture formed in a central portion of said recoil pulley facing said recoil cover so as to be retained by the recoil pulley, said rope being wound on said recoil pulley several times with the other end of the rope extending outside said recoil case via said hole in said rope guide, wherein on removing said recoil cover said rope can be readily replaced by a new rope by insertion through said hole in the rope guide, winding the new rope on the pulley, and fastening the wound end of the new rope to the pulley via said recess therein, without any further disassembly of the device, as a result of unobstructed access to said pulley and recess therein being provided on removal of said recoil cover.

2. The recoil starter of claim 1, said hole in said rope guide being effectively tangential to said rope when said rope is pulled to start said engine.

3. The recoil starter of claim 1, wherein said one end, of said rope extending through and secured in said aperture in said central portion of said recoil pulley, has a knot therein for being secured by said aperture to said recoil pulley.

4. In an internal combustion engine including a crankcase and a crankshaft, a recoil starter comprising a recoil case, adapted to be fixed to the crankcase of the engine, said recoil case having a recess at a forward side thereof, a rotatable shaft, supported by a wall of said recoil case, for selectively driving the crankshaft of the engine, said shaft having an axis of rotation, a pulley having a forward side and being affixed to the shaft for rotation therewith, said pulley being disposed at a forward side of said recoil case recess and having an opening extending in a direction parallel to said axis of rotation and in the same direction as said forward side of said recoil case recess.

a pulley rope wound about the pulley, said rope having one end secured in said pulley opening and an opposite end located outside of said recoil case recess, a cover, secured to said recoil case, for covering said recoil case recess, said cover having a surface facing said recoil case recess, the space between said cover surface and said pulley forward side being unobstructed, and a rope guide, with a hole therein through which said pulley rope passes, and a peripheral recess to be locked into said recoil case recess when said recoil case and cover are assembled, wherein upon removal of said cover from said recoil case, said pulley and rope thereon with said one end secured in said opening of said pulley at said forward side of said recoil case are immediately accessible and replacement of said rope may be readily achieved without any further disassembly of said recoil starter.

5. The recoil starter of claim 4, said hole in said rope guide being effectively tangential to said rope when said rope is pulled to start said engine.

6. The recoil starter of claim 4, wherein said one end, of said rope secured in said pulley opening, has a knot therein for being secured by said opening to said pulley.

* * * * *